United States Patent
Zhao et al.

(10) Patent No.: US 12,130,450 B1
(45) Date of Patent: Oct. 29, 2024

(54) OPTICAL ASSEMBLY WITH HIGH-REFRACTIVE-INDEX FRESNEL LENS AND CHROMATIC ABERRATION CORRECTOR

(71) Applicant: META PLATFORMS TECHNOLOGIES, LLC, Menlo Park, CA (US)

(72) Inventors: Yang Zhao, Kirkland, WA (US); Ying Geng, Bellevue, WA (US); Jacques Gollier, Sammamish, WA (US); Douglas Robert Lanman, Bellevue, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/163,150

(22) Filed: Jan. 29, 2021

Related U.S. Application Data

(60) Provisional application No. 63/132,007, filed on Dec. 30, 2020.

(51) Int. Cl.
G02B 27/01 (2006.01)
G02B 3/08 (2006.01)
G02B 27/42 (2006.01)

(52) U.S. Cl.
CPC ............ G02B 3/08 (2013.01); G02B 27/4211 (2013.01)

(58) Field of Classification Search
CPC ..... G02B 2/08; G02B 27/4211; G02B 27/005
USPC ........................................................ 359/569
See application file for complete search history.

(56) References Cited

U.S. PATENT DOCUMENTS

| | | | | |
|---|---|---|---|---|
| 5,206,499 | A * | 4/1993 | Mantravadi | G01S 3/7867 359/399 |
| 2005/0011513 | A1* | 1/2005 | Johnson | F24S 30/455 126/600 |
| 2005/0030489 | A1* | 2/2005 | Togino | G03B 21/60 353/74 |
| 2007/0201148 | A1* | 8/2007 | Eckhardt | G01J 1/0411 359/742 |
| 2015/0226887 | A1* | 8/2015 | Gombert | G02B 19/0009 359/742 |
| 2016/0025897 | A1* | 1/2016 | Twitchen | G02B 3/04 359/356 |
| 2017/0010488 | A1* | 1/2017 | Klug | G02B 27/283 |
| 2017/0219828 | A1* | 8/2017 | Tsai | G02F 1/137 |
| 2017/0227190 | A1* | 8/2017 | Fujikawa | C08G 59/22 |
| 2019/0049632 | A1* | 2/2019 | Shin | G02B 21/34 |

(Continued)

OTHER PUBLICATIONS

Refractive index of ZnS (Zinc sulfide)—Debenham, http://refractiveindex.info. (Year: 2008).*

(Continued)

*Primary Examiner* — Audrey Y Chang
(74) *Attorney, Agent, or Firm* — Morgan, Lewis & Bockius LLP

(57) ABSTRACT

An optical assembly includes a Fresnel lens and a diffractive optical element. The Fresnel lens includes a high-refractive-index material having a refractive index greater than 1.9. The diffractive optical element is optically coupled with the Fresnel lens to compensate for chromatic aberration caused by the Fresnel lens. A method for imaging light with the optical assembly is also disclosed.

20 Claims, 12 Drawing Sheets

(56) References Cited

U.S. PATENT DOCUMENTS

2020/0183158 A1* 6/2020 Peng ................. G02B 27/0955
2021/0103141 A1* 4/2021 Chen ................... G02B 27/005

OTHER PUBLICATIONS

Refractive-index-of-SiC http://refractiveindex.info. (Year: 2008).*
Refractive-index-of-TiO2 (http://refractveindex.info).*

* cited by examiner

US 12,130,450 B1

OPTICAL ASSEMBLY WITH HIGH-REFRACTIVE-INDEX FRESNEL LENS AND CHROMATIC ABERRATION CORRECTOR

RELATED APPLICATIONS

This application claims the benefit of, and priority to, U.S. Provisional Patent Application Ser. No. 63/132,007, filed Dec. 30, 2020, which is incorporated by reference herein in its entirety.

TECHNICAL FIELD

The present disclosure relates generally to high refractive index optics and, more specifically, to an optical assembly including a high refractive index Fresnel lens.

BACKGROUND

Head-mounted display devices (also called herein head-mounted displays) are gaining popularity as means for providing visual information to user. However, the size and weight of conventional head-mounted displays have limited applications of head-mounted displays.

Fresnel lenses provide apertures and focal lengths comparable to conventional lenses. Because Fresnel lenses are typically thinner and lighter than conventional lenses of similar performance features (e.g., aperture and/or focal length), replacing conventional lenses in head-mounted displays with Fresnel lenses can reduce the size and weight of the head-mounted displays. However, Fresnel lenses suffer from diffractions and other optical artifacts associated with Fresnel structures (e.g., visibility of the boundary of the Fresnel zones), and thus, their use in imaging applications is limited.

SUMMARY

Accordingly, there is a need for Fresnel lenses with reduced optical artifacts, which can enhance the user's experience with head-mounted displays for virtual reality and/or augmented reality operations.

In accordance with some embodiments, an optical assembly includes a Fresnel lens and a diffractive optical element. The Fresnel lens includes a high-refractive-index material having a refractive index greater than (or equal to) 1.9. The diffractive optical element is optically coupled with the Fresnel lens to compensate for chromatic aberration caused by the Fresnel lens.

In accordance with some embodiments, a Fresnel lens includes a plurality of Fresnel structures made of a high-refractive-index material having a refractive index greater than (or equal to) 1.9. A Fresnel zone corresponding to a respective Fresnel structure has a width greater than 0.5 mm and the respective Fresnel structure has a depth less than 0.5 mm.

In accordance with some embodiments, a head-mounted display device includes a display device for providing an image light, and any Fresnel lens described herein. The Fresnel lens is optically coupled with the display device to project the image light.

In accordance with some embodiments, a method includes directing light with a Fresnel lens including a high-refractive-index material having a refractive index greater than (or equal to) 1.9, and compensating for chromatic aberrations caused by the Fresnel lens with a diffractive optical element.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

These figures are not drawn to scale unless indicated otherwise.

DETAILED DESCRIPTION

As explained above, Fresnel lenses suffer from diffractions and other optical artifacts associated with Fresnel structures (e.g., visibility of the boundary of the Fresnel zones), and thus, their use in imaging applications is limited. Accordingly, there is a need for Fresnel lenses with reduced optical artifacts, which can enhance the user's experience with head-mounted displays for virtual reality and/or augmented reality operations.

Described herein are optical assemblies with Fresnel lenses and diffractive optical elements. The Fresnel lenses have a high refractive index. When such Fresnel lenses are coupled with diffractive optical elements, the optical assemblies maintain the benefits of conventional Fresnel lenses (e.g., compactness and light weight) while reducing or eliminating the artifacts associated with conventional Fresnel lenses. Additional features that further reduce the optical artifacts of Fresnel lenses are also described. Such optical assemblies may be used in head-mounted displays for virtual reality and/or augmented reality operations.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
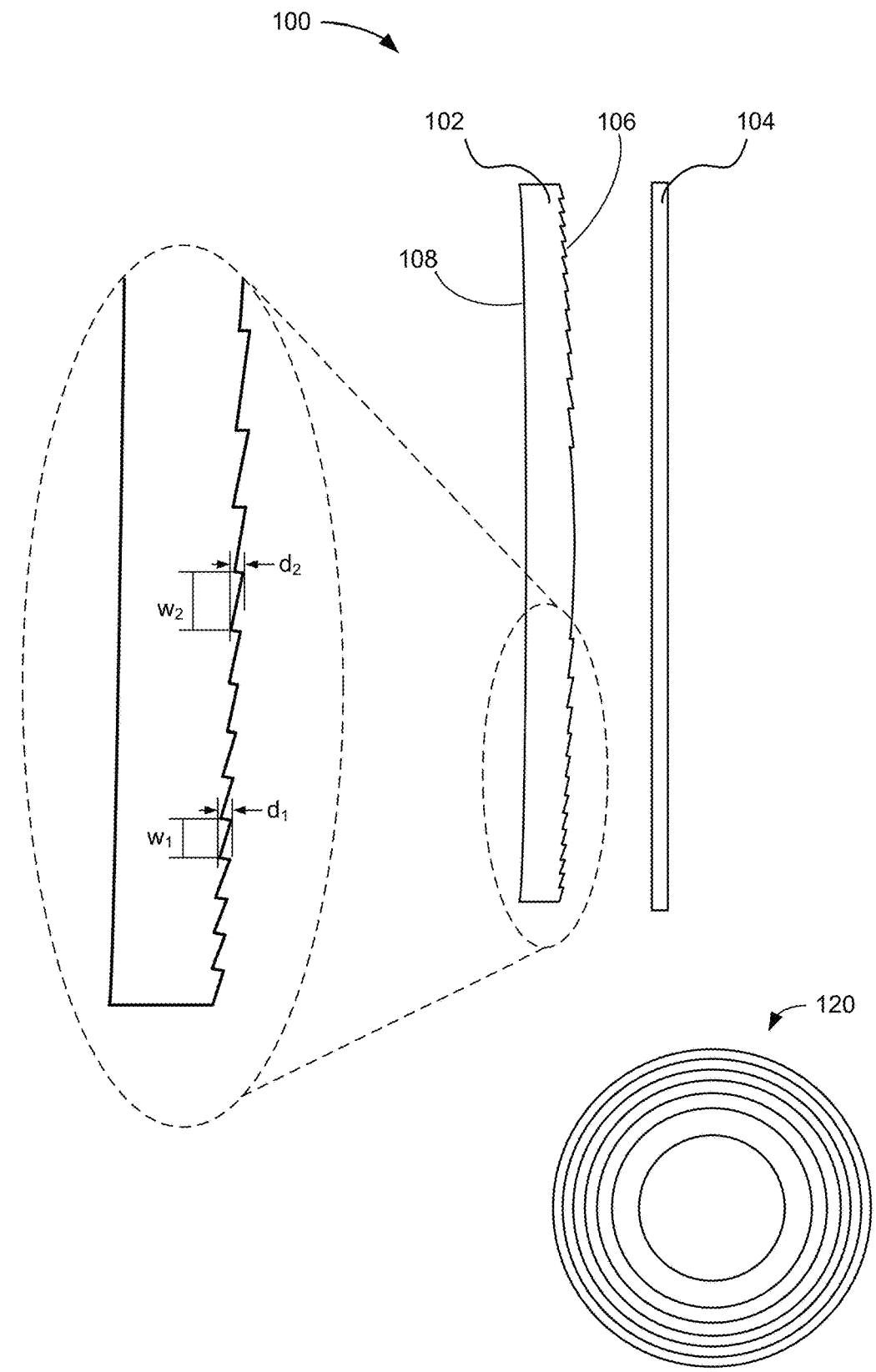
FIG. 1 is a schematic diagram illustrating an optical assembly with a Fresnel lens in accordance with some embodiments.

FIG. 1 is a schematic diagram illustrating an optical assembly 100 with a Fresnel lens 102 in accordance with some embodiments.

The Fresnel lens 102 includes a high-refractive-index material (e.g., the Fresnel lens 102 is made of the high-refractive-index material). A Fresnel lens, such as Fresnel lens 102, has a plurality of Fresnel zones (shown in the front elevational view 120 of the Fresnel lens), and each Fresnel zone has a respective Fresnel structure. The Fresnel structure includes a slope facet for redirecting incident light and a draft facet between two adjacent slope facets, as described further with respect to FIGS. 3A and 3B. In some embodiments, the Fresnel structure is a multi-faceted ring structure with at least three facets: the slope facet, the draft facet, and a base facet.

Figure 2A:
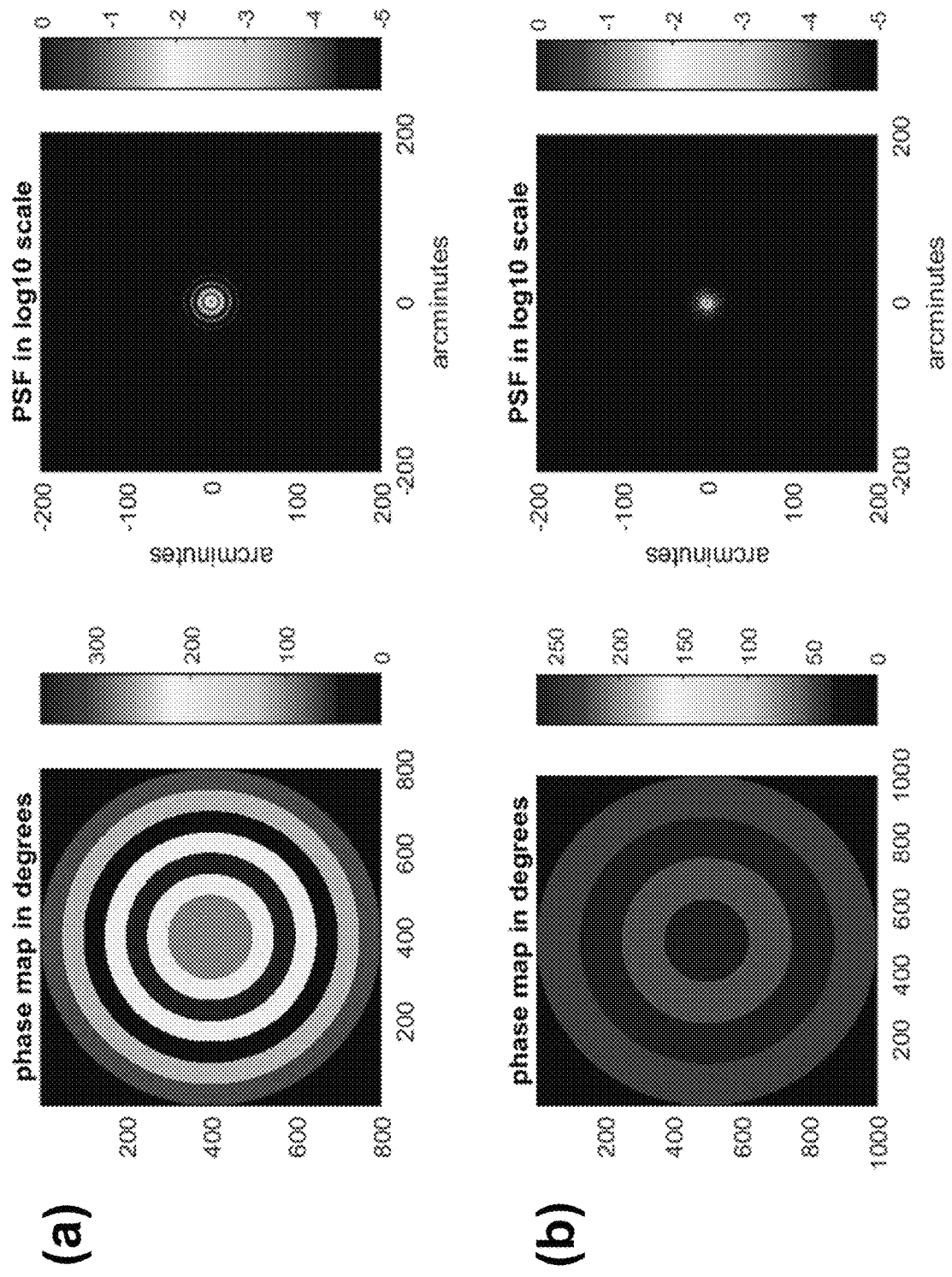
FIG. 2A illustrates point spread functions for Fresnel lenses having different Fresnel zone widths in accordance with some embodiments.

The change in the direction of light refracted by a refracting medium is described by the Snell's law, which provides:

$$n_1 \sin \theta_1 = n_2 \sin \theta_2$$

where $n_1$ is the refractive index of the originating medium, $n_2$ is the refractive index of the refracting medium, $\theta_1$ is the angle of incidence, $\theta_2$ is the angle of refraction. Thus, the high-refractive-index material allows the Fresnel structure to have a low slope angle to obtain refraction that is otherwise available only with a high slope angle for a Fresnel structure made with a low-refractive-index material. The low slope angle allows a large width of the Fresnel structure (measured in a radial direction of the Fresnel zone). As shown in FIG. 2A, wide Fresnel zones allow a smaller point spread function (PSF), whereas narrow Fresnel zones increase or widen the point spread function, partly due to the diffraction caused by narrow Fresnel structures. Thus, the high-refractive-index material reduces the diffraction caused by narrow Fresnel structures, which, in turn, improves the resolution of the image focused by a Fresnel lens made by the high-refractive-index material. In some embodiments, each Fresnel zone has a width greater than 0.5 mm (e.g., for a lens having a diameter between 40 and 60 mm and a focal length between 20 and 30 mm). In some embodiments, each Fresnel zone has a width greater than 0.6 mm. In some embodiments, each Fresnel zone has a width greater than 0.7 mm. In some embodiments, each Fresnel zone has a width greater than 0.8 mm. In some embodiments, each Fresnel zone has a width greater than 0.9 mm. In some embodiments, each Fresnel zone has a width greater than 1.0 mm. In some embodiments, each Fresnel zone has a width greater than 1.1 mm. In some embodiments, each Fresnel zone has a width greater than 1.2 mm. In some embodiments, each Fresnel zone has a width greater than 1.3 mm. In some embodiments, each Fresnel zone has a width greater than 1.4 mm. In some embodiments, each Fresnel zone has a width greater than 1.5 mm.

In addition, the low slope angle allows a low depth of the Fresnel structure (measured in a direction perpendicular to the plane defined by the Fresnel lens). The low depth of the Fresnel structure reduces the visibility of the boundary of the Fresnel zones, thereby improves the quality of the projected image. In some embodiments, each Fresnel zone has a depth less than 0.5 mm. In some embodiments, each Fresnel zone has a depth less than 0.45 mm. In some embodiments, each Fresnel zone has a depth less than 0.4 mm. In some embodiments, each Fresnel zone has a depth less than 0.35 mm. In some embodiments, each Fresnel zone has a depth less than 0.3 mm. In some embodiments, each Fresnel zone has a depth less than 0.25 mm. In some embodiments, each Fresnel zone has a depth less than 0.2 mm. In some embodiments, each Fresnel zone has a depth less than 0.15 mm. In some embodiments, each Fresnel zone has a depth less than 0.1 mm.

In some embodiments, the width of each Fresnel structure need not be constant. For example, as shown in FIG. 1, the Fresnel lens may include a first Fresnel structure having a first width $w_1$ and a second Fresnel structure having a second width $w_2$ that is different from the first width $w_1$.

In some embodiments, the high-refractive-index material has a refractive index greater than or equal to 1.9 (e.g., at 450 nm, 500 nm, 550 nm, 600 nm, 650 nm, 700 nm, or 750 nm). In some embodiments, the high-refractive-index material has a refractive index greater than or equal to 2.0 (e.g., at 450 nm, 500 nm, 550 nm, 600 nm, 650 nm, 700 nm, or 750 nm). In some embodiments, the high-refractive-index material has a refractive index greater than or equal to 2.1 (e.g., at 450 nm, 500 nm, 550 nm, 600 nm, 650 nm, 700 nm, or 750 nm). In some embodiments, the high-refractive-index material has a refractive index greater than or equal to 2.2 (e.g., at 450 nm, 500 nm, 550 nm, 600 nm, 650 nm, 700 nm, or 750 nm). In some embodiments, the high-refractive-index material has a refractive index greater than or equal to 2.3 (e.g., at 450 nm, 500 nm, 550 nm, 600 nm, 650 nm, 700 nm, or 750 nm). In some embodiments, the high-refractive-index material includes titanium dioxide (n=~2.6), tantalum pentoxide (n=~2.15), strontium titanate (n=~2.4), zirconium dioxide (also called cubic zirconia, n=~2.15), zinc oxide (n=~2.0), zinc sulfide n=~2.37), diamond (n=~2.4), or silicon carbide (n=~2.64). In some cases, high-index lanthanum having a refractive index greater than or equal to 1.90 may be used.

In some embodiments, the high refractive-index material has a transmittance of at least 50% over a wavelength range between 400 nm and 2,000 nm. In some embodiments, the high-refractive-index material also has wherein the high refractive-index material has a transmittance of at least 60%, 70%, 80%, or 90% over a wavelength range between 400 nm and 2,000 nm. In some embodiments, the high-refractive-index material also has wherein the high refractive-index material has a transmittance of at least 50%, 60%, 70%, 80%, or 90% over a wavelength range between 450 nm and 800 nm.

In general, high-refractive-index materials also have high dispersion (which is characterized by low Abbe numbers). For example, in some embodiments, the high-refractive-index material has an Abbe number less than (or equal to) 30. In some embodiments, the high-refractive-index material has an Abbe number less than (or equal to) 25. In some embodiments, the high-refractive-index material has an Abbe number less than (or equal to) 20. In some embodiments, the high-refractive-index material has an Abbe number less than (or equal to) 19. In some embodiments, the high-refractive-index material has an Abbe number less than (or equal to) 18. In some embodiments, the high-refractive-index material has an Abbe number less than (or equal to) 17 (e.g., between 15 and 16, between 15 and 17, between 16 and 17). In some embodiments, the high-refractive-index material has an Abbe number less than (or equal to) 16 (e.g., between 15 and 16). For example, titanium dioxide has an Abbe number of ~9.87, zinc oxide has an Abbe number of ~12.42, zinc sulfide has an Abbe number of ~15.43, zirconium oxide has an Abbe number of ~33.54, and silicon carbide has an Abbe number of ~25.96.

Such high dispersion of high-refractive-index materials causes large chromatic aberrations in an image light transmitted through a lens made of such high-refractive-index materials. In some embodiments, the optical assembly 100 includes a diffractive optical element 104 that is optically coupled with the Fresnel lens 102 (e.g. the diffractive optical element 104 is positioned to receive light that has been transmitted through the Fresnel lens 102). The diffractive optical element 104 compensates for chromatic aberration caused by the Fresnel lens (e.g., the diffractive optical element 104 is a chromatic aberration corrector), as described with respect to FIGS. 2B and 2C. In some embodiments, the diffractive optical element is Pancharatnam-Berry phase lens (described with respect to FIGS. 4A-4E), a volume hologram, a metalens, or a binary phase diffractive optical element.

As shown in FIG. 1, the Fresnel lens 102 has a first surface 106 facing toward the diffractive optical element 104 and a second surface 108 that is opposite to the first surface 106 (e.g., the second surface 108 faces away from the diffractive optical element 104). In some embodiments, the Fresnel lens 102 has Fresnel structures on the first surface 106, as shown in FIG. 1. In some embodiments, the Fresnel lens 102 has Fresnel structures on the second surface 108.

In some embodiments, one or more anti-reflective coatings are disposed on the Fresnel lens 102. In some embodiments, an anti-reflective coating is disposed on the first surface 106. In some embodiments, an anti-reflective coating is disposed on the second surface 108. In some embodiments, anti-reflective coatings are disposed on both the first surface 106 and the second surface 108. In some embodiments, the anti-reflective coating is a gradient-index anti-reflective coating, which has a continuously varying index of refraction. In some embodiments, the anti-reflective coating includes one or more layers of material having a refractive index different from the refractive index of the Fresnel lens 102.

FIG. 2A illustrates point spread functions for Fresnel lenses having different Fresnel zone widths in accordance with some embodiments. In FIG. 2A, the row (a) shows a first Fresnel lens with narrow Fresnel zones and the point spread function (PSF) obtained by using the first Fresnel lens, and the row (b) shows a second Fresnel lens with wide Fresnel zones and the point spread function obtained by using the second Fresnel lens. As shown in FIG. 2A, the second Fresnel lens with the wide Fresnel zones has a narrower (or smaller) point spread function, which indicates that the second Fresnel lens with the wide Fresnel zones can image a point source with a higher resolution.

Figure 2B:
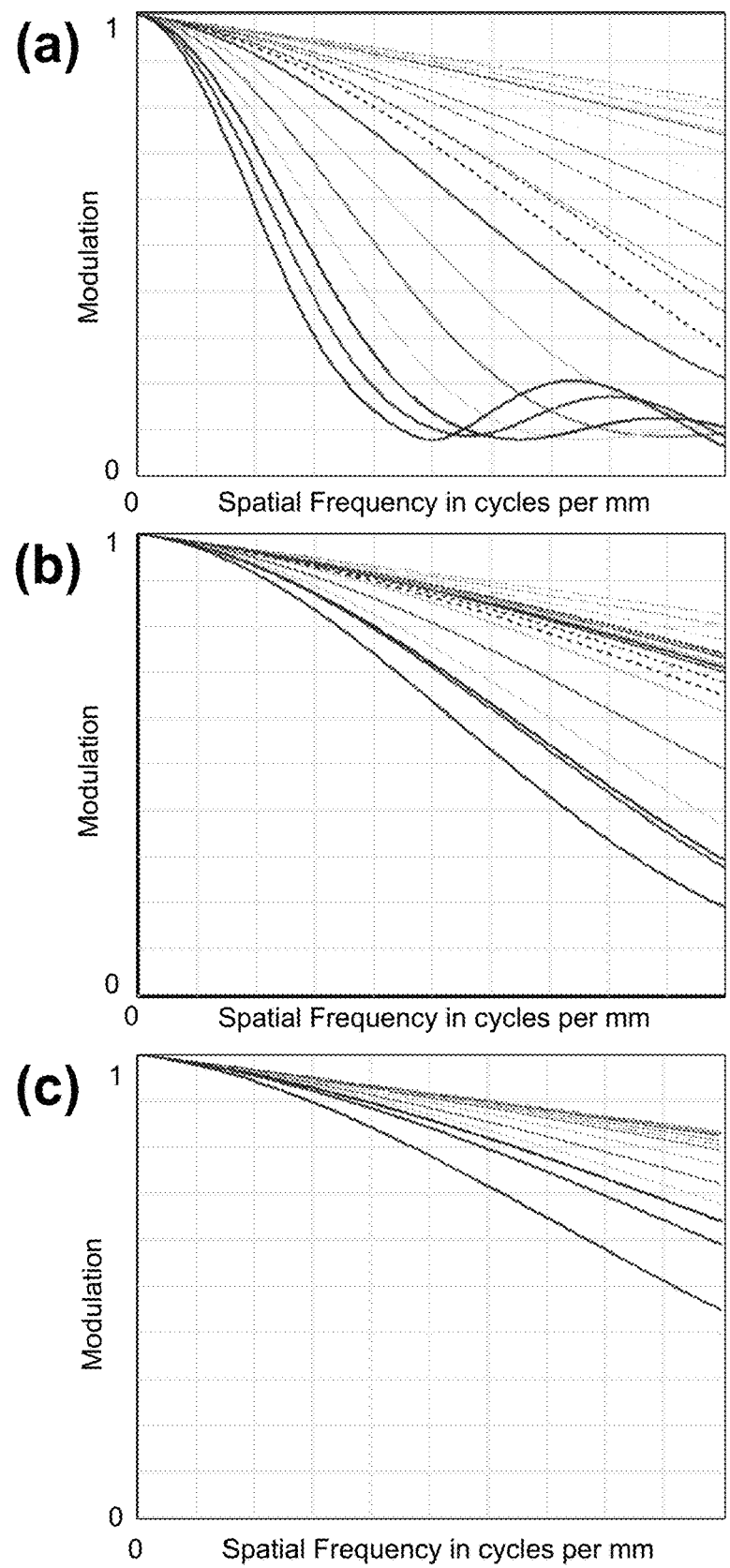
FIG. 2B illustrates modulation transfer functions of different optical configurations including a Fresnel lens in accordance with some embodiments.

FIG. 2B illustrates modulation transfer functions of different optical configurations including a Fresnel lens in accordance with some embodiments. The horizontal axis of each modulation transfer function represents a spatial frequency (ranging from 0 to 25 cycles per mm) and the vertical axis of each modulation transfer function represents the degree of modulation. The graph (a) of FIG. 2B shows a modulation transfer function for a Fresnel lens made of cyclic olefin copolymer, which has a refractive index of ~1.53, for a gaze angle of up to 30°. The graph (b) of FIG. 2B shows a modulation transfer function for a combination of a Fresnel lens made of cyclic olefin copolymer and a diffractive optical element operating as a chromatic aberration corrector, for a gaze angle of up to 30°. The modulation transfer functions shown in graph (b) are less spread than the modulation transfer functions shown in graph (a), indicating that the combination of the Fresnel lens made of cyclic olefin copolymer and the diffractive optical element has a higher resolution than the Fresnel lens alone. The graph (c) of FIG. 2B shows a modulation transfer function for a combination of a Fresnel lens made of a high-refractive-index material (e.g., zinc sulfide) and a diffractive optical element operating as a chromatic aberration corrector, for a gaze angle of up to 30°. The modulation transfer functions shown in graph (c) are less spread than the modulation transfer functions shown in graph (b), indicating that the combination of the Fresnel lens made of a high-refractive-index material and the diffractive optical element has a higher resolution than the combination of the Fresnel lens made of cyclic olefin copolymer and the diffractive optical element. These graphs show that the combination of a Fresnel lens made of a high-refractive-index-material with a diffractive optical element has superior resolution in imaging contrasts compared to the Fresnel lens made of cyclic olefin copolymer with or without a chromatic aberration corrector.

Figure 2C:
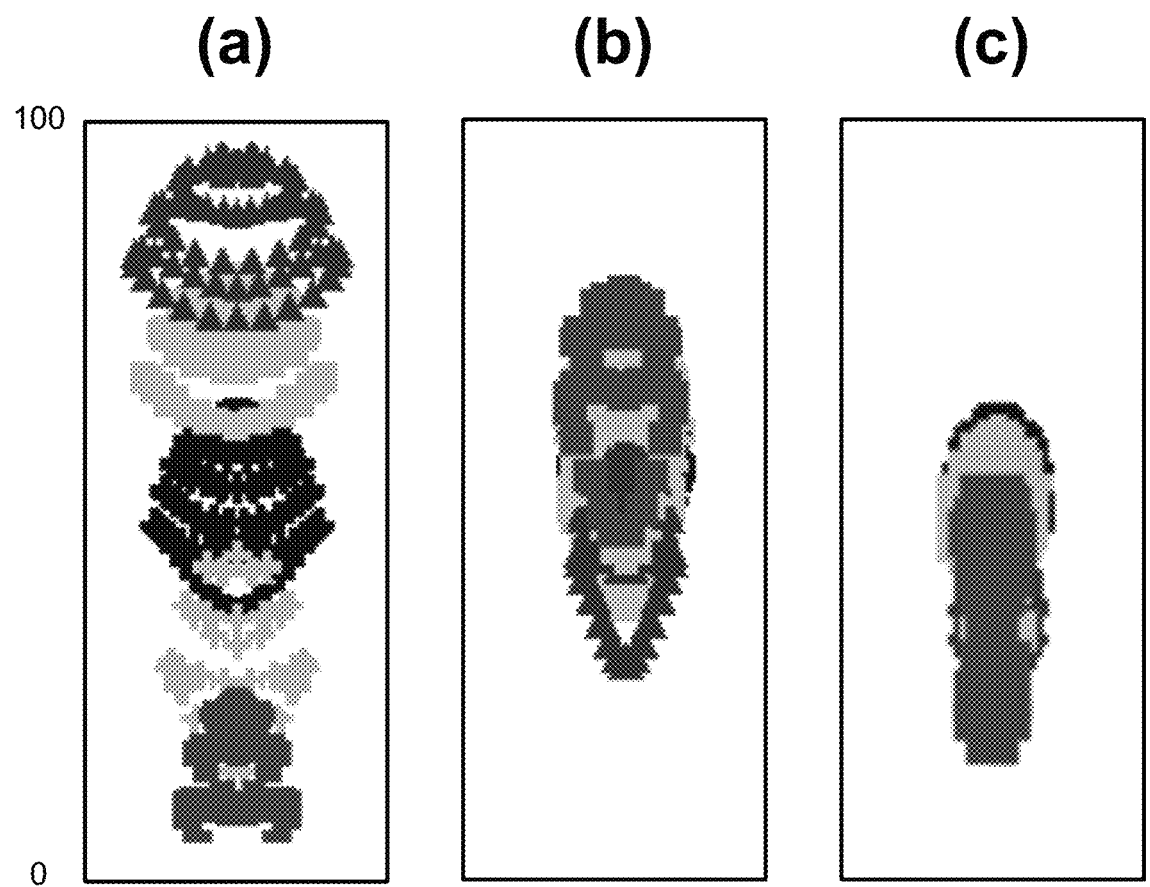
FIG. 2C shows spot diagrams for different optical configurations including a Fresnel lens in accordance with some embodiments.

FIG. 2C shows spot diagrams for different optical configurations including a Fresnel lens in accordance with some embodiments. In the spot diagrams, different colors (represented in different shades) correspond to different wavelengths. The image (a) of FIG. 2C is a spot diagram for a Fresnel lens made of cyclic olefin copolymer (corresponding to the Fresnel lens for the graph (a) of FIG. 2B) for a gaze angle of 30°. The image (b) of FIG. 2C is a spot diagram for a combination of a Fresnel lens made of cyclic olefin copolymer and a diffractive optical element operating as a chromatic aberration corrector (corresponding to the combination for the graph (b) of FIG. 2B) for a gaze angle of 30°. The image (c) of FIG. 2C is a spot diagram for a combination of a Fresnel lens made of a high-refractive-index material and a diffractive optical element operating as a chromatic aberration corrector (corresponding to the combination for the graph (b) of FIG. 2B) for a gaze angle of 30°. The spot diagrams shown in FIG. 2C show that the combination of a Fresnel lens made of a high-refractive-index-material with a diffractive optical element is superior in its ability to reduce optical artifacts compared to the Fresnel lens made of cyclic olefin copolymer with or without a chromatic aberration corrector.

Figure 3A:
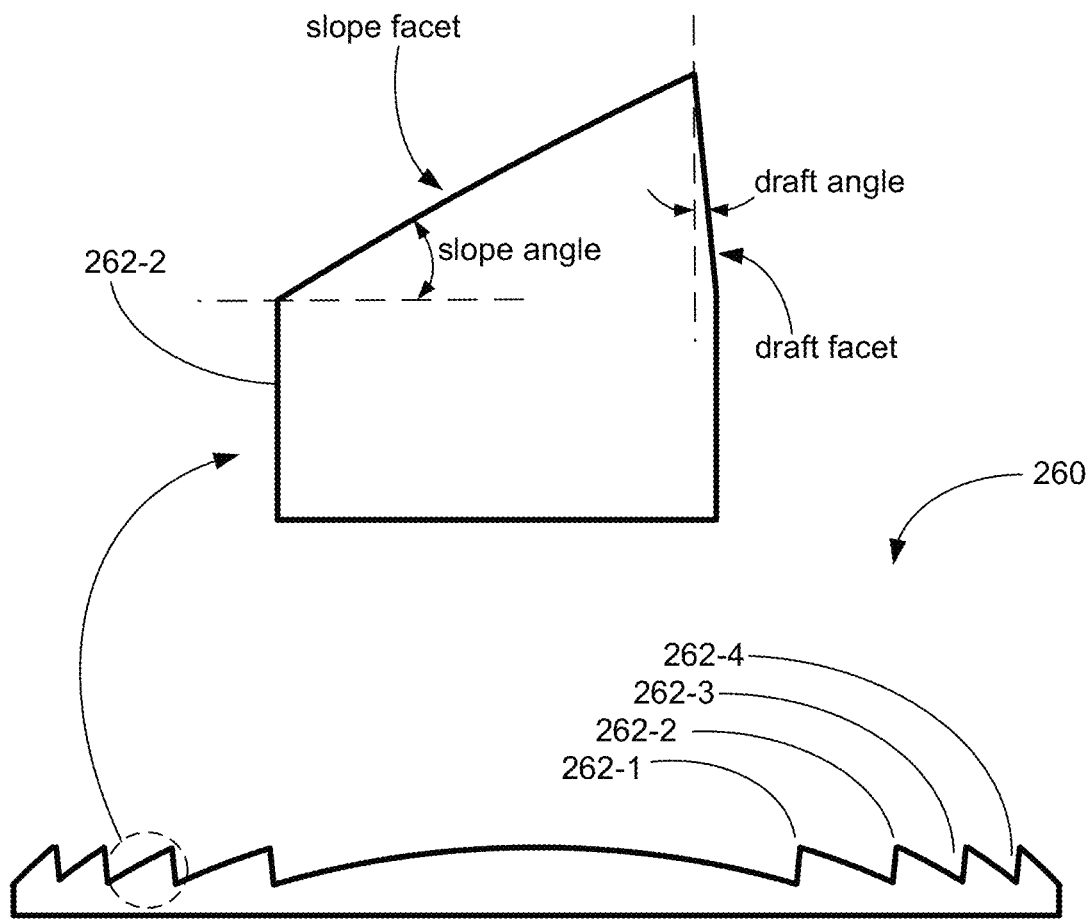
FIGS. 3A and 3B are schematic diagrams illustrating different portions of a Fresnel lens in accordance with some embodiments.

FIG. 3A illustrates a cross-section of Fresnel lens 260. A Fresnel lens, such as Fresnel lens 260, includes a plurality of Fresnel structures 262 (e.g., a plurality of annular rings 262-1, 262-2, 262-3, and 262-4, called Fresnel zones). As shown in FIG. 3A, each Fresnel structure 262 (e.g., Fresnel structure 262-2) has a slope facet and a draft facet. The draft facet is characterized by a draft angle (e.g., the draft facet is tilted by the draft angle from a reference axis). In some embodiments, the slope facet is characterized by a slope angle (e.g., the slope facet is tilted by the slope angle from the reference axis). In conventional Fresnel lens 260, Fresnel structures 262 (e.g., 262-1, 262-2, 262-3, and 262-4) have a same draft angle.

Figure 3B:
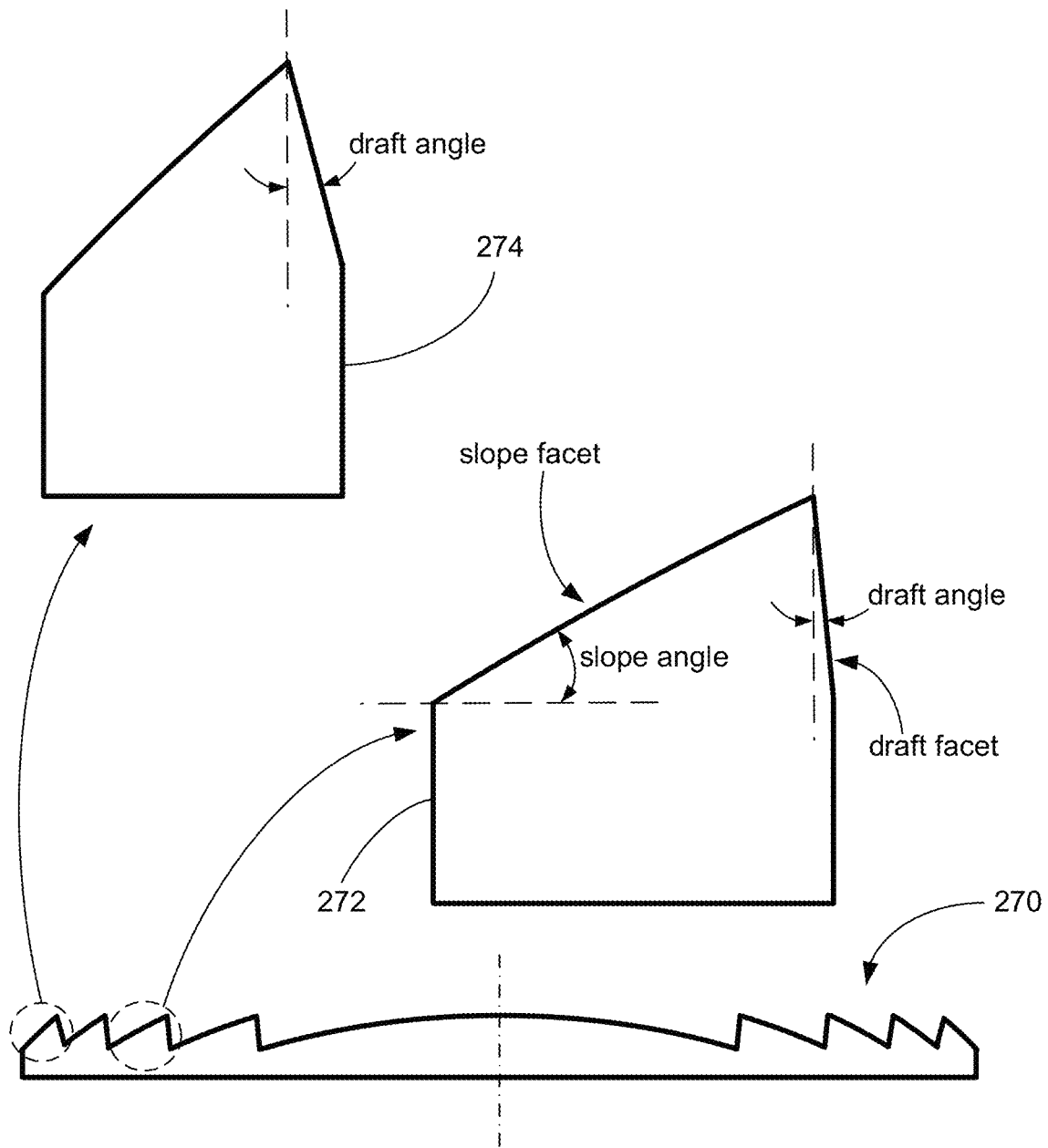

FIG. 3B illustrates a cross-section of Fresnel lens 270 with dynamic draft in accordance with some embodiments. In Fresnel lens 270, the draft angle of each Fresnel structure is based on a distance of the Fresnel structure from a center of the lens. For example, as shown in FIG. 3B, a Fresnel structure located close to the center of the lens has a draft facet that is steeper than a draft facet of a Fresnel structure located away from the center of the lens (e.g., a Fresnel structure located closer to the center of the lens has a smaller draft angle than a draft angle of a Fresnel structure located away from the center of the lens). In FIG. 3B, Fresnel structure 272 has a particular draft angle, and Fresnel structure 274 has a draft angle that is distinct from the draft angle of Fresnel structure 272 (e.g., Fresnel structure 274 has a draft angle that is greater than the draft angle of Fresnel structure 272). Such dynamic draft may be used to reduce the visibility of the boundary of the Fresnel zones (e.g., the visibility of the draft facets).

FIGS. 4A-4D are schematic diagrams illustrating polarization selective lens 400 (e.g., an example of Pancharatnam Berry Phase lens) in accordance with some embodiments. In some embodiments, polarization selective lens 400 corresponds to diffractive optical element 104 described above with respect to FIG. 1. Polarization selective lens 400 adds or removes optical power based in part on polarization of incident light. Polarization selective lens 400 is selective with respect to circular polarization of light. When state (handedness) of the circularly polarized light is along a helical axis of an organic crystal, polarization selective lens 400 interacts with the circularly polarized light and thereby changes the direction of the light (e.g., diffracts or reflects the light). Concurrently, while diffracting the light, polarization selective lens 400 also changes the polarization of the light and while reflecting the light, polarization selective lens 400 does not change the polarization of the light. In contrast, polarization selective lens 400 transmits light with opposite circular polarization without changing its direction or polarization. For example, a transmissive polarization selective lens 400 lens changes polarization of RCP light to LCP light and simultaneously focuses or defocuses the reflected light while transmitting LCP light without changing its polarization or direction. As another example, a reflective polarization selective lens 400 lens maintains polarization of reflected RCP light and simultaneously focuses or defocuses the light while transmitting LCP light without changing its polarization or direction. Optical properties of polarization selective lens 400 (e.g., focusing power or diffracting power) are based on variation of azimuthal angles of molecules (e.g., liquid crystal and/or organic crystal molecules). For example, for polarization selective lens 400, azimuthal angle θ of a molecule is determined based on Equation (1):

$$\theta = \left(\frac{r^2}{f} \times \frac{\pi}{\lambda}\right) / 2 \quad (1)$$

where r denotes a radial distance between the molecule and an optical center of the lens, f denotes a focal distance, and λ denotes a wavelength of the light that polarization selective lens 400 is designed for (e.g., a reference wavelength or a design wavelength). Thus, in some embodiments, the azimuthal angles of the molecules in the x-y plane increase from the optical center to an edge of the lens. In some embodiments, as expressed by Equation (1), a rate of increase in azimuthal angles between neighboring molecules also increases with the distance from the optical center of the lens. The lens creates a respective lens profile based on the orientations (e.g., azimuth angle θ) of a molecule in the x-y plane. In addition, the optical properties of polarization selective lens 400 are based on a helical axis and/or a helical pitch of helically shaped organic crystals, as described above with respect to FIG. 1.

Figures 4A, 4B, 4C, 4D:
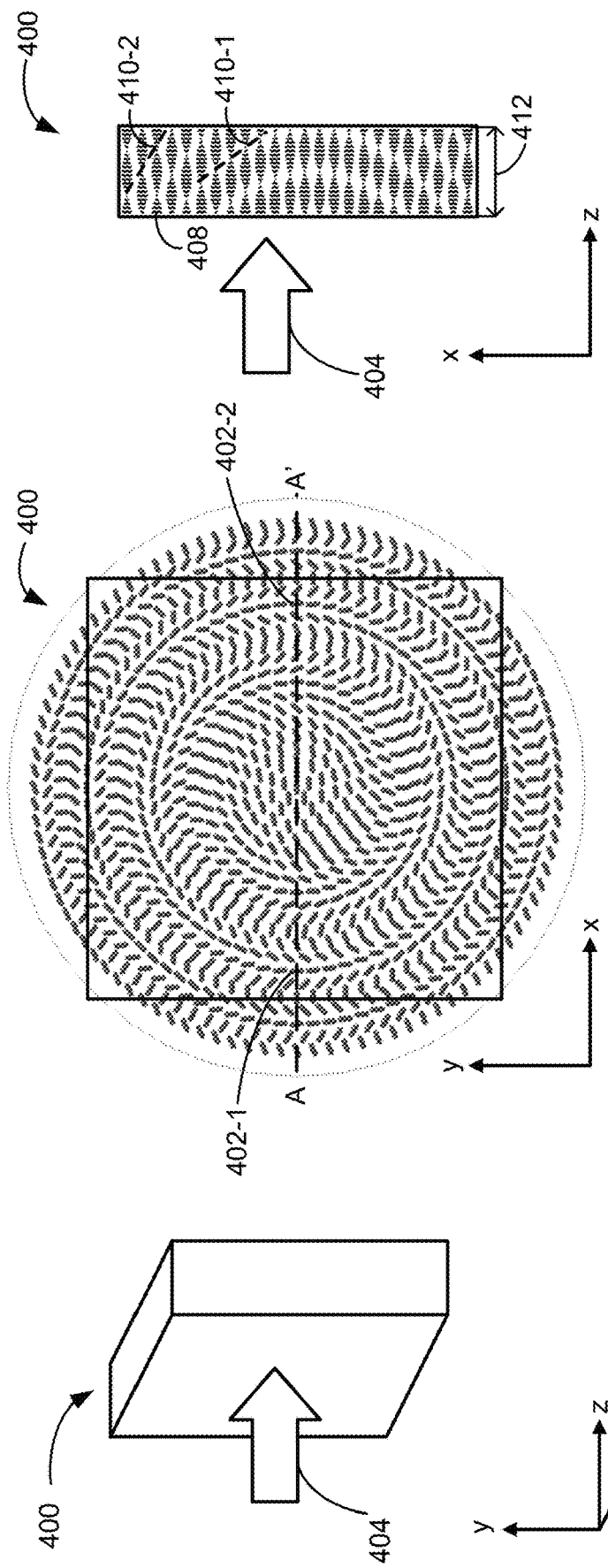
FIGS. 4A-4D are schematic diagrams illustrating a diffractive optical element in accordance with some embodiments.

FIG. 4A illustrates a three dimensional view of polarization selective lens 400 with incoming light 404 entering the lens along the z-axis. FIG. 4B illustrates an x-y plane view of polarization selective lens 400 with a plurality of helically shaped organic crystals (e.g., organic crystals 402-1 and 402-2) with various orientations. The orientations (e.g., azimuthal angle θ) of the organic crystals vary along reference line between A and A' from the center of polarization selective lens 400 toward the periphery of polarization selective lens 400. FIG. 4C illustrates an x-z-cross-sectional view of polarization selective lens 400. As shown in FIG. 4C, the organic crystals (e.g., organic crystals 402-1 and 402-2 in FIG. 4B) of polarization selective lens 400 are arranged in helical structures 408. Helical structures 408 have helical axes aligned corresponding to the z-axis. As the azimuthal angle of respective organic crystals on the x-y-plane varies, the helical structures create a volume grating with a plurality of diffraction planes (e.g., planes 410-1 and 410-2) forming cycloidal patterns. The diffraction planes (e.g., Bragg diffraction planes) defined in a volume of polarization selective lens 400 produce a periodically changing refractive index. Helical structures 408 define the polarization selectivity of polarization selective lens 400, as light with circular polarization handedness corresponding to the helical axis is diffracted while light with circular polarization with the opposite handedness is not diffracted. Helical structures 408 also define the wavelength selectivity of polarization selective lens 400, as was described above with respect to FIG. 1. Light with wavelength close to a helical pitch (e.g., helical pitch 412 in FIG. 4C) is diffracted while light with other wavelengths is not diffracted. A helical pitch refers to a distance when a helix has made a 360 degree turn along a helical axis (e.g., the z-axis in FIG. 4C). Thus, in some embodiments, two or more polarization selective lenses are used to steer light over a wide wavelength range.

FIG. 4D illustrates a detailed plane view of the molecules along the reference line between A and A' in FIG. 4B. Pitch 406 is defined as a distance along x-axis at which the azimuth angle of a helically shaped organic crystal has rotated 360 degrees from the initial orientation. In some embodiments, pitch 406 varies as a function of distance from the center of polarization selective lens 400. In case of a lens, the azimuthal angle of molecules varies in accordance with Equation (1) shown above. In such cases, the pitch at the center of the lens is the longest and the pitch at the edge of the lens is the shortest.

In some embodiments, polarization selective lens 400 is formed as a thin film positioned between two transparent substrates (e.g., flat glass substrates).

Figure 4E:
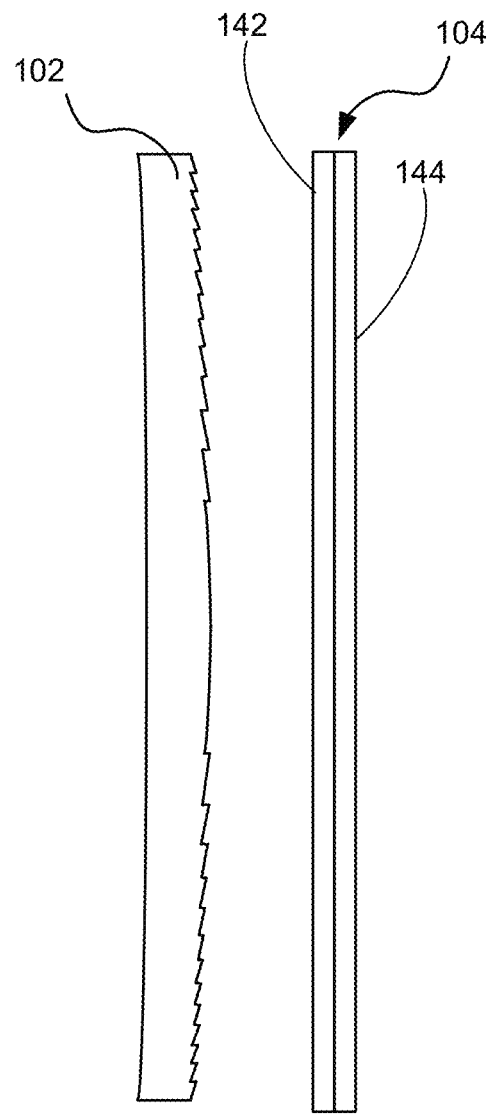
FIG. 4E is a schematic diagram illustrating an optical assembly with a Fresnel lens and a stack of diffractive optical elements in accordance with some embodiments.

FIG. 4E is a schematic diagram illustrating an optical assembly with a Fresnel lens and a stack of diffractive optical elements (e.g., polarization selective lenses 142 and 144) in accordance with some embodiments. In some embodiments, each of polarization selective lenses 142 and 144 have a structure analogous to the structure of polarization selective lens 400 described with respect to FIGS. 4A-4D. However, polarization selective lens 142 and polarization selective lens 144 have different helical pitches so that polarization selective lens 142 diffracts light having a first wavelength (e.g., corresponding to the helical pitch of polarization selective lens 142) and polarization selective lens 144 diffracts light having a second wavelength (e.g., corresponding to the helical pitch of polarization selective lens 144), while polarization selective lens 142 may forgo diffracting light having the second wavelength and polarization selective lens 144 may forgo diffracting light having the first wavelength. For example, lens 142 may have a helical pitch for diffracting blue light (e.g., 480 nm) and lens 144 may have a helical pitch for diffracting red light (e.g., 680 nm). In another example, lens 142 has a helical pitch for diffracting green light (e.g., 550 nm) and lens 144 has a helical pitch for diffracting red light (e.g., 680 nm). Many other combinations are possible. For brevity, such details are not repeated herein. Although FIG. 4E shows the stack of two diffractive optical elements, any other number of diffractive optical elements may be used (e.g., three, four, five, or six diffractive optical elements).

In some embodiments, optical assembly 100 (or Fresnel lens 102) may be used in display devices such as head-mounted display devices. In some embodiments, optical assembly 100 may be implemented as multifunctional optical components in near-eye displays for augmented reality ("AR"), virtual reality ("VR"), and/or mixed reality ("MR"). For example, the disclosed optical elements or devices may be implemented as waveguide-based combiners, eye-tracking components, display resolution enhancement components, pupil steering elements, and polarization controlling components (e.g., a quarter-wave plate or a half-wave plate), etc., which may significantly reduce the weight and size, and enhance the optical performance of the head-mounted display devices. Exemplary embodiments of head-mounted display devices for implementing optical assembly 100 are described with respect to FIGS. 5-7.

Figure 5:
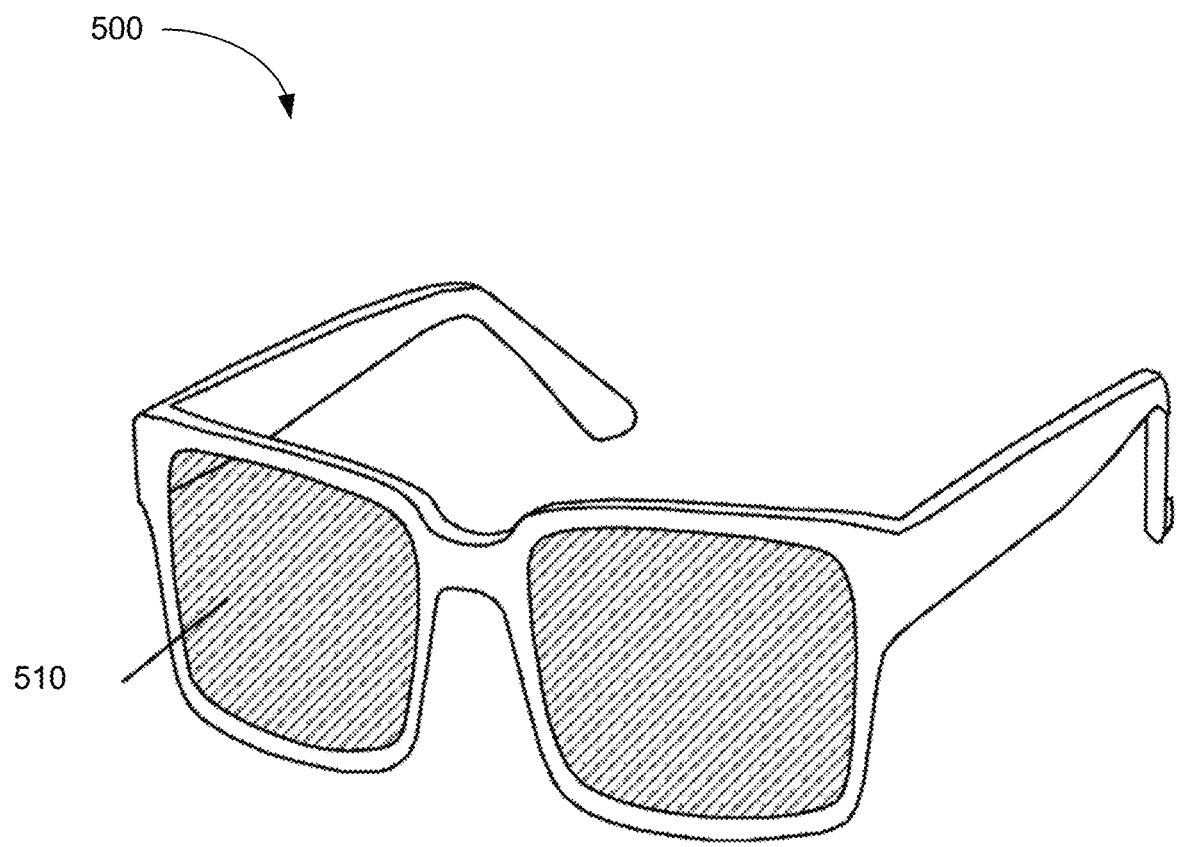
FIG. 5 is a perspective view of a display device in accordance with some embodiments.

FIG. 5 illustrates display device 500 in accordance with some embodiments. In some embodiments, display device 500 is configured to be worn on a head of a user (e.g., by having the form of spectacles or eyeglasses, as shown in FIG. 5) or to be included as part of a helmet that is to be worn by the user. When display device 500 is configured to be worn on a head of a user or to be included as part of a helmet, display device 500 is called a head-mounted display. Alternatively, display device 500 is configured for placement in proximity of an eye or eyes of the user at a fixed location, without being head-mounted (e.g., display device 500 is mounted in a vehicle, such as a car or an airplane, for placement in front of an eye or eyes of the user). As shown in FIG. 5, display device 500 includes display 510. Display 510 is configured for presenting visual contents (e.g., augmented reality contents, virtual reality contents, mixed reality contents, or any combination thereof) to a user.

Figure 6:
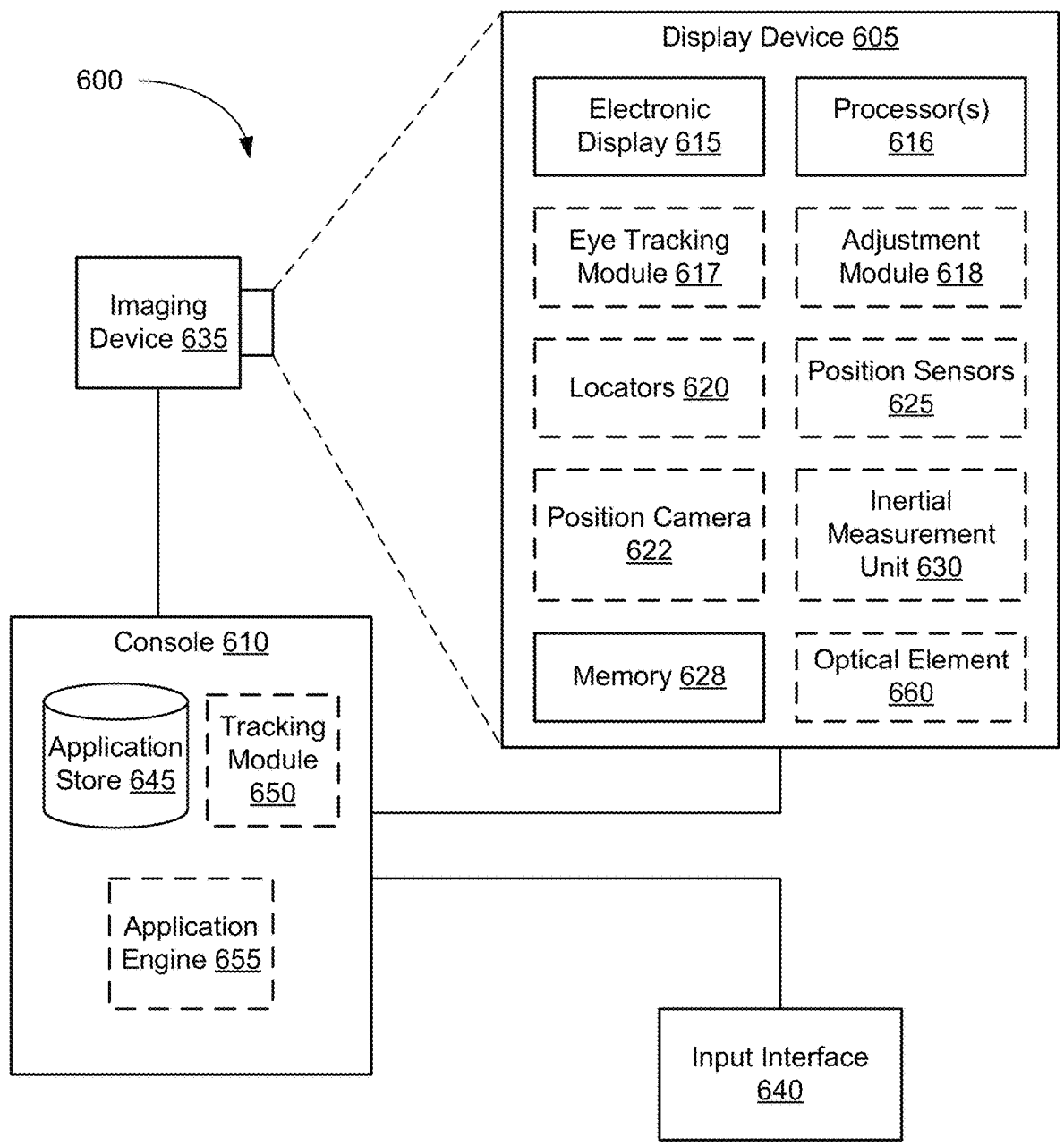
FIG. 6 is a block diagram of a system including a display device in accordance with some embodiments.

In some embodiments, display device 500 includes one or more components described herein with respect to FIG. 6. In some embodiments, display device 500 includes additional components not shown in FIG. 6.

FIG. 6 is a block diagram of system 600 in accordance with some embodiments. The system 600 shown in FIG. 6 includes display device 605 (which corresponds to display device 500 shown in FIG. 5), imaging device 635, and input interface 640 that are each coupled to console 610. While FIG. 6 shows an example of system 600 including one display device 605, imaging device 635, and input interface 640, in other embodiments, any number of these components may be included in system 600. For example, there may be multiple display devices 605 each having associated input interface 640 and being monitored by one or more imaging devices 635, with each display device 605, input interface 640, and imaging devices 635 communicating with console 610. In alternative configurations, different and/or additional components may be included in system 600. For example, in some embodiments, console 610 is connected via a network (e.g., the Internet or a wireless network) to system 600 or is self-contained as part of display device 605 (e.g., physically located inside display device 605). In some embodiments, display device 605 is used to create mixed reality by adding in a view of the real surroundings. Thus, display device 605 and system 600 described here can deliver augmented reality, virtual reality, and mixed reality.

In some embodiments, as shown in FIG. 5, display device 605 is a head-mounted display that presents media to a user. Examples of media presented by display device 605 include one or more images, video, audio, or some combination thereof. In some embodiments, audio is presented via an external device (e.g., speakers and/or headphones) that receives audio information from display device 605, console 610, or both, and presents audio data based on the audio information. In some embodiments, display device 605 immerses a user in an augmented environment.

In some embodiments, display device 605 also acts as an augmented reality (AR) headset. In these embodiments, display device 605 augments views of a physical, real-world environment with computer-generated elements (e.g., images, video, sound, etc.). Moreover, in some embodiments, display device 605 is able to cycle between different types of operation. Thus, display device 605 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 655.

Display device 605 includes electronic display 615, one or more processors 616, eye tracking module 617, adjustment module 618, one or more locators 620, one or more position sensors 625, one or more position cameras 622, memory 628, inertial measurement unit (IMU) 630, one or more optical elements 660 or a subset or superset thereof (e.g., display device 605 with electronic display 615, one or more processors 616, and memory 628, without any other listed components). Some embodiments of display device 605 have different modules than those described here. Similarly, the functions can be distributed among the modules in a different manner than is described here.

One or more processors 616 (e.g., processing units or cores) execute instructions stored in memory 628. Memory 628 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 628, or alternately the non-volatile memory device(s) within memory 628, includes a non-transitory computer readable storage medium. In some embodiments, memory 628 or the computer readable storage medium of memory 628 stores programs, modules and data structures, and/or instructions for displaying one or more images on electronic display 615.

Electronic display 615 displays images to the user in accordance with data received from console 610 and/or processor(s) 616. In various embodiments, electronic display 615 may comprise a single adjustable display element or multiple adjustable display elements (e.g., a display for each eye of a user). In some embodiments, electronic display 615 is configured to display images to the user by projecting the images onto one or more optical elements 660.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array. In some embodiments, electronic display 615 projects images to one or more optical elements 660, which reflect at least a portion of the light toward an eye of a user.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 605 (e.g., a user wearing display device 605) for viewing images from display device 605. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed. As used herein, IR refers to light with wavelengths ranging from 700 nm to 1 mm including near infrared (NIR) ranging from 750 nm to 1500 nm.

Eye tracking module 617 determines locations of each pupil of a user's eyes. In some embodiments, eye tracking module 617 instructs electronic display 615 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 617 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 617 maps the locations of the user's pupil while looking at the reference points to corresponding signals received on the IR tracking array). As mentioned above, in some embodiments, system 600 may use other eye tracking systems than the embedded IR one described herein.

Adjustment module 618 generates an image frame based on the determined locations of the pupils. In some embodiments, this sends a discrete image to the display that will tile subimages together thus a coherent stitched image will appear on the back of the retina. Adjustment module 618 adjusts an output (i.e. the generated image frame) of electronic display 615 based on the detected locations of the pupils. Adjustment module 618 instructs portions of electronic display 615 to pass image light to the determined locations of the pupils. In some embodiments, adjustment module 618 also instructs the electronic display to not pass image light to positions other than the determined locations of the pupils. Adjustment module 618 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 620 are objects located in specific positions on display device 605 relative to one another and relative to a specific reference point on display device 605. A locator 620 may be a light emitting diode (LED), a corner cube reflector, a reflective marker, a type of light source that contrasts with an environment in which display device 605 operates, or some combination thereof. In embodiments where locators 620 are active (e.g., an LED or other type of light emitting device), locators 620 may emit light in the visible band (e.g., about 500 nm to 750 nm), in the infrared band (e.g., about 750 nm to 1 mm), in the ultraviolet band (about 100 nm to 500 nm), some other portion of the electromagnetic spectrum, or some combination thereof.

In some embodiments, locators 620 are located beneath an outer surface of display device 605, which is transparent to the wavelengths of light emitted or reflected by locators 620 or is thin enough to not substantially attenuate the wavelengths of light emitted or reflected by locators 620. Additionally, in some embodiments, the outer surface or other portions of display device 605 are opaque in the visible band of wavelengths of light. Thus, locators 620 may emit light in the IR band under an outer surface that is transparent in the IR band but opaque in the visible band.

IMU 630 is an electronic device that generates calibration data based on measurement signals received from one or more position sensors 625. Position sensor 625 generates one or more measurement signals in response to motion of display device 605. Examples of position sensors 625 include: one or more accelerometers, one or more gyroscopes, one or more magnetometers, another suitable type of sensor that detects motion, a type of sensor used for error correction of IMU 630, or some combination thereof. Position sensors 625 may be located external to IMU 630, internal to IMU 630, or some combination thereof.

Based on the one or more measurement signals from one or more position sensors 625, IMU 630 generates first calibration data indicating an estimated position of display device 605 relative to an initial position of display device 605. For example, position sensors 625 include multiple accelerometers to measure translational motion (forward/back, up/down, left/right) and multiple gyroscopes to measure rotational motion (e.g., pitch, yaw, roll). In some embodiments, IMU 630 rapidly samples the measurement signals and calculates the estimated position of display device 605 from the sampled data. For example, IMU 630 integrates the measurement signals received from the accelerometers over time to estimate a velocity vector and integrates the velocity vector over time to determine an estimated position of a reference point on display device 605. Alternatively, IMU 630 provides the sampled measurement signals to console 610, which determines the first calibration data. The reference point is a point that may be used to describe the position of display device 605. While the reference point may generally be defined as a point in space; however, in practice the reference point is defined as a point within display device 605 (e.g., a center of IMU 630).

In some embodiments, IMU 630 receives one or more calibration parameters from console 610. As further discussed below, the one or more calibration parameters are used to maintain tracking of display device 605. Based on a received calibration parameter, IMU 630 may adjust one or more IMU parameters (e.g., sample rate). In some embodiments, certain calibration parameters cause IMU 630 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 635 generates calibration data in accordance with calibration parameters received from console 610. Calibration data includes one or more images showing observed positions of locators 620 that are detectable by imaging device 635. In some embodiments, imaging device 635 includes one or more still cameras, one or more video cameras, any other device capable of capturing images including one or more locators 620, or some combination thereof. Additionally, imaging device 635 may include one or more filters (e.g., used to increase signal to noise ratio). Imaging device 635 is configured to optionally detect light emitted or reflected from locators 620 in a field of view of imaging device 635. In embodiments where locators 620 include passive elements (e.g., a retroreflector), imaging device 635 may include a light source that illuminates some or all of locators 620, which retro-reflect the light towards the light source in imaging device 635. Second calibration data is communicated from imaging device 635 to console 610, and imaging device 635 receives one or more calibration parameters from console 610 to adjust one or more imaging parameters (e.g., focal length, focus, frame rate, ISO, sensor temperature, shutter speed, aperture, etc.).

In some embodiments, display device 605 optionally includes one or more optical elements 660 (e.g., lenses, reflectors, gratings, etc.). In some embodiments, electronic display device 605 includes a single optical element 660 or multiple optical elements 660 (e.g., an optical element 660 for each eye of a user). In some embodiments, electronic display 615 projects computer-generated images on one or more optical elements 660, such as a reflective element, which, in turn, reflect the images toward an eye or eyes of a user. The computer-generated images include still images, animated images, and/or a combination thereof. The computer-generated images include objects that appear to be two-dimensional and/or three-dimensional objects. In some embodiments, one or more optical elements 660 are partially transparent (e.g., the one or more optical elements 660 have a transmittance of at least 15%, 20%, 25%, 30%, 35%, 40%, 45%, 50%, 55%, or 50%), which allows transmission of ambient light. In such embodiments, computer-generated images projected by electronic display 615 are superimposed with the transmitted ambient light (e.g., transmitted ambient image) to provide augmented reality images. In some embodiments, optical elements 660 include optical assembly 100 or Fresnel lens 102 described with respect to FIG. 1.

Input interface 640 is a device that allows a user to send action requests to console 610. An action request is a request to perform a particular action. For example, an action request may be to start or end an application or to perform a particular action within the application. Input interface 640 may include one or more input devices. Example input devices include: a keyboard, a mouse, a game controller, data from brain signals, data from other parts of the human body, or any other suitable device for receiving action requests and communicating the received action requests to console 610. An action request received by input interface 640 is communicated to console 610, which performs an action corresponding to the action request. In some embodiments, input interface 640 may provide haptic feedback to the user in accordance with instructions received from console 610. For example, haptic feedback is provided when an action request is received, or console 610 communicates instructions to input interface 640 causing input interface 640 to generate haptic feedback when console 610 performs an action.

Console 610 provides media to display device 605 for presentation to the user in accordance with information received from one or more of: imaging device 635, display device 605, and input interface 640. In the example shown in FIG. 6, console 610 includes application store 645, tracking module 650, and application engine 655. Some embodiments of console 610 have different modules than those described in conjunction with FIG. 6. Similarly, the functions further described herein may be distributed among components of console 610 in a different manner than is described here.

When application store 645 is included in console 610, application store 645 stores one or more applications for execution by console 610. An application is a group of instructions, that when executed by a processor, is used for generating content for presentation to the user. Content generated by the processor based on an application may be in response to inputs received from the user via movement of display device 605 or input interface 640. Examples of applications include: gaming applications, conferencing applications, video playback application, or other suitable applications.

When tracking module 650 is included in console 610, tracking module 650 calibrates system 600 using one or more calibration parameters and may adjust one or more calibration parameters to reduce error in determination of the position of display device 605. For example, tracking module 650 adjusts the focus of imaging device 635 to obtain a more accurate position for observed locators on display device 605. Moreover, calibration performed by tracking module 650 also accounts for information received from IMU 630. Additionally, if tracking of display device 605 is lost (e.g., imaging device 635 loses line of sight of at least a threshold number of locators 620), tracking module 650 re-calibrates some or all of system 600.

In some embodiments, tracking module 650 tracks movements of display device 605 using second calibration data from imaging device 635. For example, tracking module 650 determines positions of a reference point of display device 605 using observed locators from the second calibration data and a model of display device 605. In some embodiments, tracking module 650 also determines positions of a reference point of display device 605 using position information from the first calibration data. Additionally, in some embodiments, tracking module 650 may use portions of the first calibration data, the second calibration data, or some combination thereof, to predict a future location of display device 605. Tracking module 650 provides the estimated or predicted future position of display device 605 to application engine 655.

Application engine 655 executes applications within system 600 and receives position information, acceleration information, velocity information, predicted future positions, or some combination thereof of display device 605 from tracking module 650. Based on the received information, application engine 655 determines content to provide to display device 605 for presentation to the user. For example, if the received information indicates that the user has looked to the left, application engine 655 generates content for display device 605 that mirrors the user's movement in an augmented environment. Additionally, application engine 655 performs an action within an application executing on console 610 in response to an action request received from input interface 640 and provides feedback to the user that the action was performed. The provided feedback may be visual or audible feedback via display device 605 or haptic feedback via input interface 640.

Figure 7A:
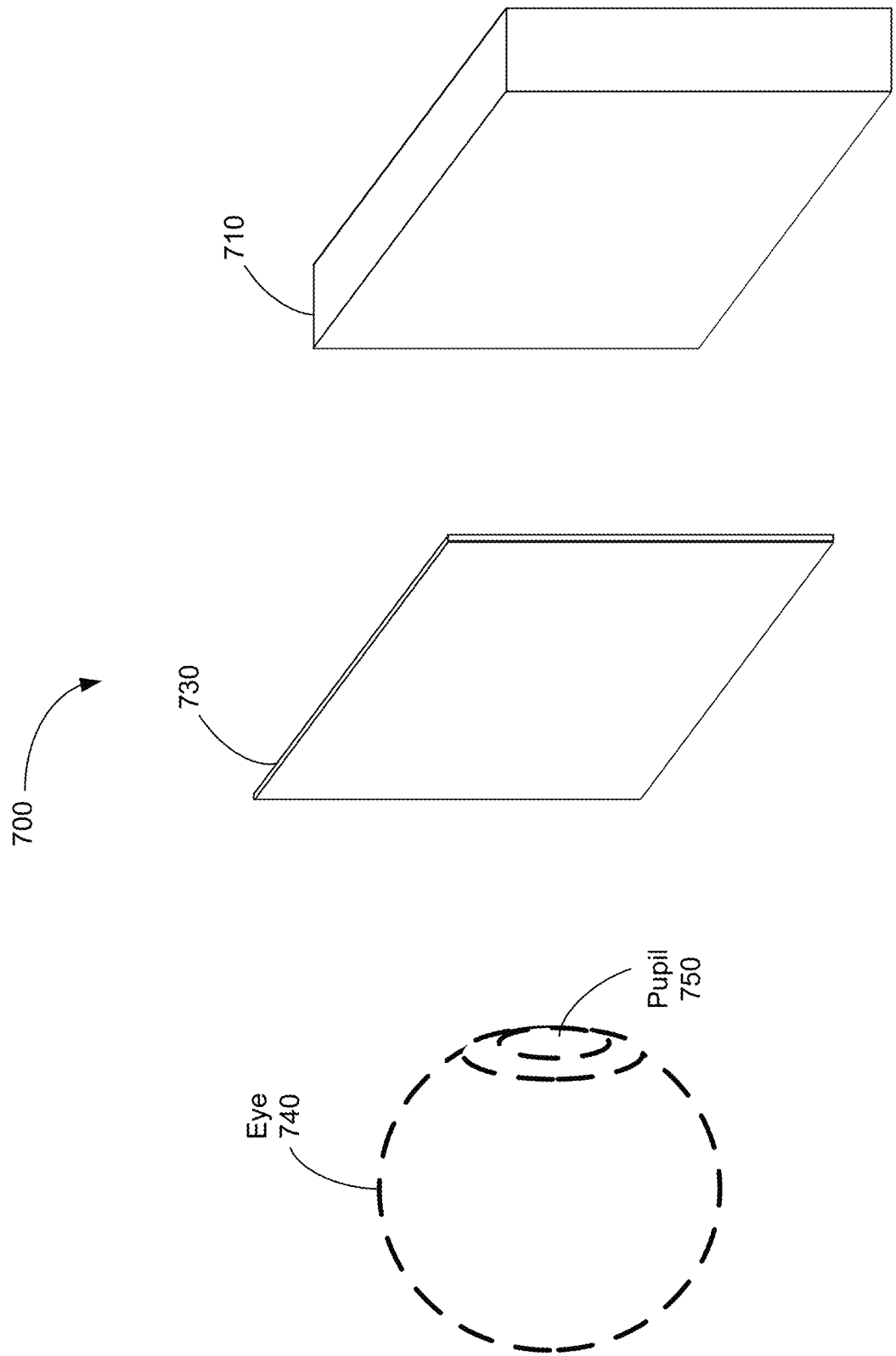
FIG. 7A is an isometric view of a display device in accordance with some embodiments.

FIG. 7A is an isometric view of display device 700 in accordance with some embodiments. In some other embodiments, display device 700 is part of some other electronic display (e.g., a digital microscope, a head-mounted display device, etc.). In some embodiments, display device 700 includes light emission device 710 (e.g., a light emission device array) and an optical assembly 730, which may include one or more lenses and/or other optical components. In some embodiments, optical assembly 730 includes optical assembly 100 or Fresnel lens 102. In some embodiments, display device 700 also includes an IR detector array.

Light emission device 710 emits image light and optional IR light toward the viewing user. Light emission device 710 includes one or more light emission components that emit light in the visible light (and optionally includes components that emit light in the IR). Light emission device 710 may include, e.g., an array of LEDs, an array of microLEDs, an array of organic LEDs (OLEDs), an array of superluminescent LEDs (sLEDS) or some combination thereof.

In some embodiments, light emission device 710 includes an emission intensity array (e.g., a spatial light modulator) configured to selectively attenuate light emitted from light emission device 710. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to provide image light and/or control what portion of the image light is passed to the optical assembly 730. In some embodiments, display device 700 uses the emission intensity array to facilitate providing image light to a location of pupil 750 of eye 740 of a user, and minimize the amount of image light provided to other areas in the eyebox. In some embodiments, display device 700 includes, or is optically coupled with, optical assembly 100 operating as a display resolution enhancement component. In some embodiments, display device 700 is an augmented reality display device. In such embodiments, display device 700 includes, or is optically coupled with, optical assembly 100 operating as a waveguide-based combiner or as a polarization selective reflector.

The optical assembly 730 includes one or more lenses. The one or more lenses in optical assembly 730 receive modified image light (e.g., attenuated light) from light emission device 710, and direct the modified image light to a location of pupil 750. The optical assembly 730 may include additional optical components, such as color filters, mirrors, etc. In some embodiments, optical assembly 730 includes optical assembly 100 or Fresnel lens 102 described with respect to FIG. 1.

An optional IR detector array detects IR light that has been retro-reflected from the retina of eye 740, a cornea of eye 740, a crystalline lens of eye 740, or some combination thereof. The IR detector array includes either a single IR sensor or a plurality of IR sensitive detectors (e.g., photodiodes). In some embodiments, the IR detector array is separate from light emission device 710. In some embodiments, the IR detector array is integrated into light emission device 710.

In some embodiments, light emission device 710 including an emission intensity array make up a display element. Alternatively, the display element includes light emission device 710 (e.g., when light emission device 710 includes individually adjustable pixels) without the emission intensity array. In some embodiments, the display element additionally includes the IR array. In some embodiments, in response to a determined location of pupil 750, the display element adjusts the emitted image light such that the light output by the display element is refracted by one or more lenses toward the determined location of pupil 750, and not toward other locations in the eyebox.

In some embodiments, display device 700 includes one or more broadband sources (e.g., one or more white LEDs) coupled with a plurality of color filters, in addition to, or instead of, light emission device 710.

Figure 7B:
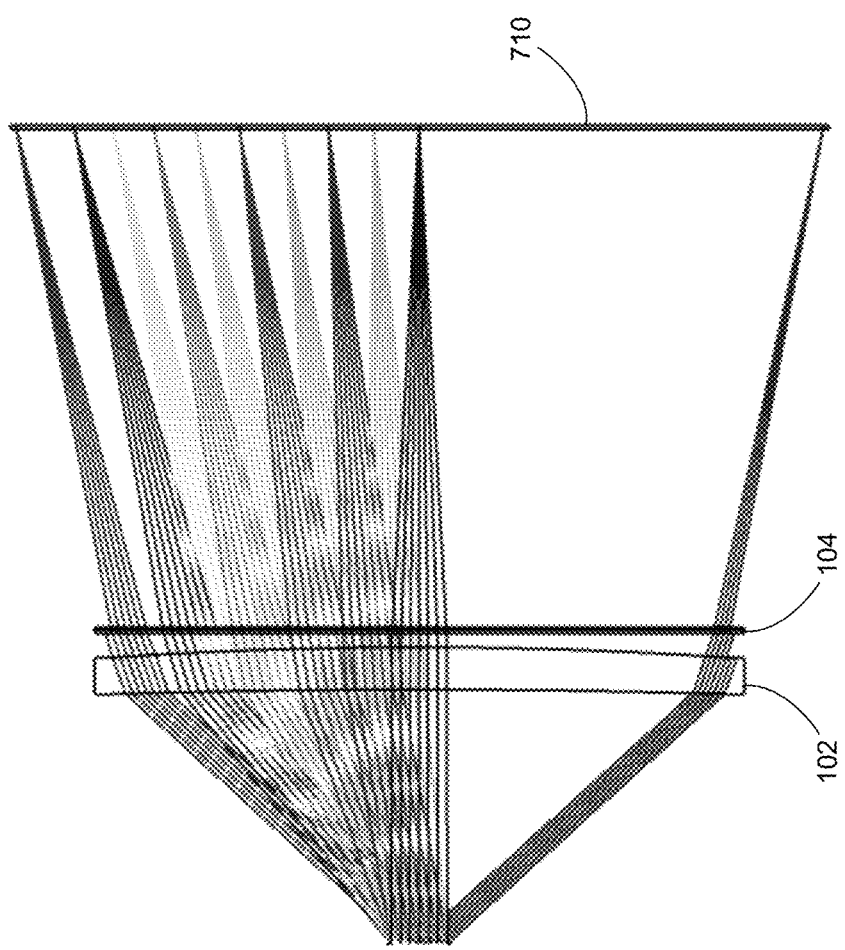
FIG. 7B is a schematic diagram illustrating a display device in accordance with some embodiments.

FIG. 7B is a schematic diagram illustrating a display device in accordance with some embodiments.

The display device includes display 710 for providing an image light, and Fresnel lens 102 positioned to receive the image light from display 710 and project the image light.

In FIG. 7B, the image light (from display 710) is directed with Fresnel lens 102 including a high-refractive-index material having a refractive index greater than 1.9. Chromatic aberrations caused by Fresnel lens 102 are compensated, reduced, or eliminated by diffractive optical element 104. Diffractive optical element 104 may be positioned before or after Fresnel lens 102 to compensate for chromatic aberrations caused by Fresnel lens 102. For example, although FIG. 7B shows that diffractive optical element 104 is positioned between Fresnel lens 102 and display 710, in some embodiments, Fresnel lens 102 is positioned between diffractive optical element 104 and display 710.

In some embodiments, diffractive optical element 104 also compensates for aberrations other than chromatic aberrations caused by Fresnel lens 102.

Although FIG. 7B also shows diffractive optical element 104, in some embodiments, the display device does not include diffractive optical element 104 (e.g., when the display provides a monochromatic image light, or an image light within a narrow wavelength range). For brevity, details of such configuration are not repeated herein.

In accordance with some embodiments, an optical assembly includes a lens (e.g., a Fresnel lens or a non-Fresnel lens, such as a spherical lens, an aspherical lens, etc.) and a diffractive optical element (e.g., a Pancharatnam Berry phase lens) optically coupled to the lens to compensate for aberrations caused by the lens.

Although various drawings illustrate operations of particular components or particular groups of components with respect to one eye, a person having ordinary skill in the art would understand that analogous operations can be performed with respect to the other eye or both eyes. For brevity, such details are not repeated herein.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Although some of various drawings illustrate a number of operations in a particular order, operations which are not order dependent may be reordered and other operations may be combined or broken out. While some reordering or other groupings are specifically mentioned, others will be apparent to those of ordinary skill in the art, so the ordering and groupings presented herein are not an exhaustive list of alternatives.

It will also be understood that, although the terms first, second, etc. are, in some instances, used herein to describe various elements, these elements should not be limited by these terms. These terms are used only to distinguish one element from another. For example, a first Fresnel structure could be termed a second Fresnel structure, and, similarly, a second Fresnel structure could be termed a first Fresnel structure, without departing from the scope of the various described embodiments. The first Fresnel structure and the second Fresnel structure are both Fresnel structures, but they are not the same Fresnel structure. Similarly, a first width could be termed a second width, and, similarly, a second width could be termed a first width, without departing from the scope of the various described embodiments. The first width and the second width are both widths, but they are not the same width.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical assembly, comprising:
   a Fresnel lens including a high-refractive-index material having a refractive index greater than or equal to 1.9; and
   a stack of diffractive optical elements, including a first diffractive optical element and a second diffractive optical element, the stack of diffractive optical elements being optically coupled with the Fresnel lens, wherein the first diffractive optical element is a Pancharatnam-Berry phase lens or a volume hologram; the second diffractive optical element is a Pancharatnam-Berry phase lens or a volume hologram; the first diffractive optical element is characterized by a first helical pitch; the second diffractive optical element is characterized by a second helical pitch distinct from the first helical pitch; and the stack of diffractive optical elements compensates for chromatic aberration caused by the Fresnel lens.

2. The optical assembly of claim 1, wherein the Fresnel lens has a plurality of Fresnel zones, each Fresnel zone of the plurality of Fresnel zones having a width greater than 0.5 mm.

3. The optical assembly of claim 2, wherein each Fresnel zone has a depth less than 0.5 mm.

4. The optical assembly of claim 1, wherein the refractive index of the high-refractive-index material is greater than 2.3.

5. The optical assembly of claim 1, wherein the high-refractive-index material has an Abbe number less than or equal to 30.

6. The optical assembly of claim 1, wherein the high-refractive-index material includes zirconium dioxide, diamond, or silicon carbide.

7. The optical assembly of claim 1, wherein the Fresnel lens includes an anti-reflective coating.

8. The optical assembly of claim 1, wherein the high-refractive-index material includes diamond.

9. The optical assembly of claim 1,
wherein the first diffractive optical element is configured to diffract light having a first wavelength without diffracting light having a second wavelength that is distinct from the first wavelength and the second diffractive optical element is configured to diffract the light having the second wavelength without diffracting the light having the first wavelength.

10. The optical assembly of claim 1, wherein the first diffractive optical element compensates for chromatic aberration caused by the Fresnel lens in a principal ray having an angle of 30° relative to an optical axis of the Fresnel lens.

11. The optical assembly of claim 1, wherein the Fresnel lens has a first surface and a second surface opposite to the first surface, the Fresnel lens has a plurality of Fresnel structures on the first surface, the first surface of the Fresnel lens is positioned facing the first diffractive optical element, and the second surface of the Fresnel lens is positioned away from the first diffractive optical element.

12. The optical assembly of claim 1, wherein the first diffractive optical element is the Pancharatnam-Berry phase lens.

13. An optical assembly comprising:
a Fresnel lens with a plurality of Fresnel structures made of a high-refractive-index material having a refractive index greater than or equal to 2.3 and an Abbe number less than or equal to 16, wherein a Fresnel zone corresponding to a respective Fresnel structure has a width greater than 0.5 mm, the respective Fresnel structure has a depth less than 0.5 mm; and
a stack of polarization selective lenses including a first polarization selective lens and a second polarization selective lens distinct from the first polarization selective lens, wherein the first polarization selective lens is characterized by a first helical pitch for diffracting light having a first wavelength without diffracting light having a second wavelength distinct from the first wavelength and the second polarization selective lens is characterized by a second helical pitch for diffracting the light having the second wavelength without diffracting the light having the first wavelength.

14. The optical assembly of claim 13, wherein the Fresnel lens further comprises an anti-reflective coating.

15. A head-mounted display device, comprising:
a display for providing an image light; and
the optical assembly of claim 13, wherein the optical assembly is optically coupled with the display to project the image light.

16. The head-mounted display device of claim 15, wherein:
the stack of polarization selective lenses is optically coupled with the Fresnel lens, wherein the first polarization selective lens is a Pancharatnam-Berry phase lens or a volume hologram; the second polarization selective lens is a Pancharatnam-Berry phase lens or a volume hologram; the first polarization selective lens is characterized by a first helical pitch; the second polarization selective lens is characterized by a second helical pitch distinct from the first helical pitch; and the stack of polarization selective lenses compensates for chromatic aberration caused by the Fresnel lens.

17. The head-mounted display device of claim 16,
wherein the first polarization selective lens is configured to diffract light having a first wavelength without diffracting light having a second wavelength that is distinct from the first wavelength and the second polarization selective lens is configured to diffract the light having the second wavelength without diffracting the light having the first wavelength.

18. A method, comprising:
directing light with a Fresnel lens including a high-refractive-index material having a refractive index greater than or equal to 1.9; and
compensating for chromatic aberrations caused by the Fresnel lens with a stack of diffractive optical elements optically coupled with the Fresnel lens, the stack of diffractive optical elements including a first diffractive optical element and a second diffractive optical element, wherein the first diffractive optical element is a Pancharatnam-Berry phase lens or a volume hologram; the second diffractive optical element is a Pancharatnam-Berry phase lens or a volume hologram; the first diffractive optical element is characterized by a first helical pitch; and the second diffractive optical element is characterized by a second helical pitch distinct from the first helical pitch.

19. The method of claim 18,
wherein the first diffractive optical element is configured to diffract light having a first wavelength without diffracting light having a second wavelength that is distinct from the first wavelength and the second diffractive optical element is configured to diffract the light having the second wavelength without diffracting the light having the first wavelength.

20. The method of claim 18, wherein the first diffractive optical element is the Pancharatnam-Berry phase lens.

* * * * *